United States Patent [19]

Klier et al.

[11] Patent Number: 4,480,632

[45] Date of Patent: Nov. 6, 1984

[54] LIGHT TRANSMISSIVE INSULATION APPARATUS

[75] Inventors: Shimon Klier, Simtat Magal 4, Savyon; Ofer Novik, Rehovot, both of Israel

[73] Assignee: Shimon Klier, Savyon, Israel

[21] Appl. No.: 363,451

[22] Filed: Mar. 30, 1982

[30] Foreign Application Priority Data

Mar. 30, 1981 [IL] Israel .................................. 62528
Aug. 27, 1981 [IL] Israel .................................. 63678

[51] Int. Cl.³ .............................................. F24J 3/02
[52] U.S. Cl. .................................... 126/415; 126/426
[58] Field of Search .................... 126/415, 426; 4/498, 4/499, 501, 502

[56] References Cited

U.S. PATENT DOCUMENTS

| | | |
|---|---|---|
| 3,072,920 | 1/1963 | Yellott . |
| 3,949,095 | 4/1976 | Pelehach et al. . |
| 3,998,204 | 12/1976 | Fuchs et al. ........................ 126/415 |
| 4,016,015 | 4/1977 | Respen et al. . |
| 4,074,482 | 2/1978 | Klahr .................................. 350/312 |
| 4,091,800 | 5/1978 | Fletcher et al. . |
| 4,106,905 | 8/1978 | Schmitt et al. . |
| 4,121,567 | 10/1978 | Carson . |
| 4,137,612 | 2/1979 | Kelley . |
| 4,195,622 | 4/1980 | Dolza et al. . |
| 4,222,366 | 9/1980 | Acker . |
| 4,256,087 | 3/1981 | Sowers . |

FOREIGN PATENT DOCUMENTS 2064097 10/1981 United Kingdom ............... 126/415

*Primary Examiner*—Carroll B. Dority, Jr.
*Attorney, Agent, or Firm*—Cushman, Darby & Cushman

[57] ABSTRACT

A light transmissive insulation system comprising a plurality of layers of light transmissive insulating material, the material being characterized by transmissivity to solar radiation, and low transmissivity to thermal infra-red radiation. A solar pond employing the insulation system is also described.

9 Claims, 5 Drawing Figures

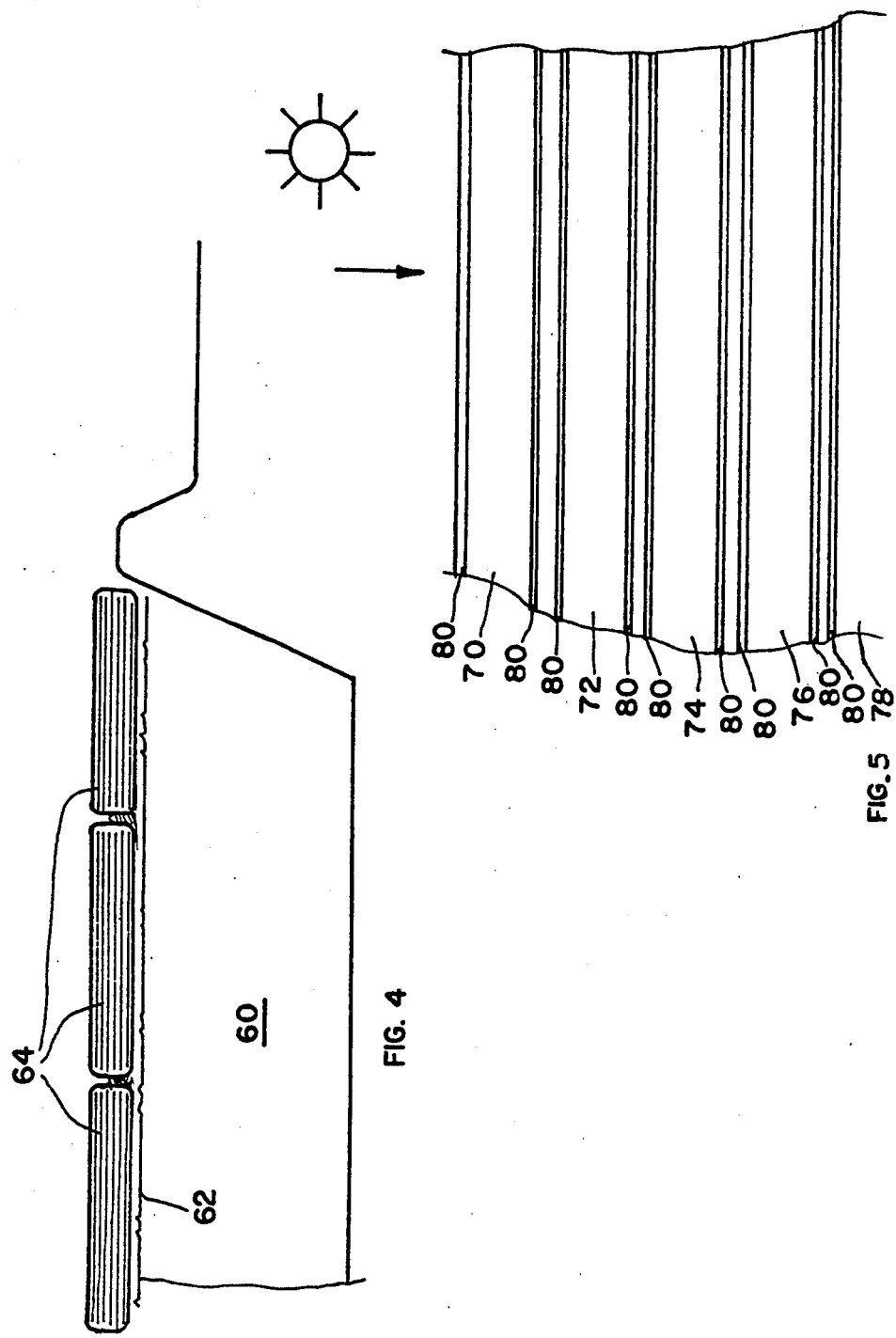

LIGHT TRANSMISSIVE INSULATION APPARATUS

FIELD OF THE INVENTION

The present invention relates to insulation generally and more particularly to insulation apparatus and structures which are substantially light transmissive and are suitable for use with solar ponds including defined portions of larger bodies such as lakes or seas.

BACKGROUND OF THE INVENTION

The problem of insulation is a concern of increasing importance throughout the world in view of the current energy crisis. Of particular interest is the problem of providing thermal insulation which does not interfere with the passage of radiation, such as light and heat in one direction.

One practical example of a system which requires insulation for enhanced efficiency is the solar pond which is described in the following reference: H. Weinberger, The Physics of the Solar Pond, Solar Energy, Volume 8, page 45 (1964). In order to lower the significant heat losses to the atmosphere at the surface of the pond, it is considered desirable to provide some sort of stable air layer between the pond surface and the atmosphere. The construction of such an air gap over a relatively large area does not appear to be feasible due to the difficulty of providing and maintaining in place over the pond a cover which is transmissive to solar radiation. U.S. Pat. No. 4,091,800 describes a solar pond construction which inter alia may comprise a foam formed of a sudsing agent as in fire-fighting foams disposed on the top surface thereof. No technique for retaining the foam in place is disclosed or suggested.

Various types of apparatus for assisting solar heating of swimming pools are disclosed in the following U.S. Pat. Nos.: 4,016,015; 4,121,567; 4,137,612; 4,106,905; 3,072,920; 4,195,622; 3,949,095; 4,222,366 and 4,256,087. None of these disclose a multilayered construction for enhancing solar radiation transmissivity, while limiting thermal infra-red back radiation.

SUMMARY OF THE INVENTION

The present invention seeks to provide an insulation system which prevents molecular diffusion therethrough and which provides extremely low transmissivity to infra-red back radiation in the wavelength range of 6–20 microns.

According to a preferred embodiment of the invention, the insulation system comprises a plurality of spaced layers of light transmissive insulating material. The layers of light transmissive insulating material may comprise, for example, bubbles or beads or alternatively sheets of web material, such as glass or plastic.

Additionally in accordance with a preferred embodiment of the invention both sides of the light transmissive insulating material may be coated with a relatively thin coating of a material having a relatively low index of refraction. Such a material may be a fluorocarbon which may be applied as a layer of 'grease' on the opposite surfaces of adjacent sheets of insulating material arranged to define an air gap therebetween.

Additionally in accordance with a preferred embodiment of the present invention, a plurality of coatings of light transmissive materials may be associated with each layer of light transmissive insulating material, also referred to as barrier material. Preferably the coatings have different indices of refraction and are arranged so as to present coatings of gradually changing index of refraction along the path of solar radiation entering the solar pond. Preferably, the index of refraction of the coatings should increase as the radiation enters a layer of insulating material from an air gap and decrease as the radiation leaves the insulating material towards an air gap. This structure provides enhanced transmissivity, through the insulation, of incident solar radiation.

Further in accordance with an embodiment of the present invention, the insulation system is arranged to float on a body of liquid which it is sought to heat by solar radiation passing therethrough and/or absorbed thereby.

Additionally in accordance with an embodiment of the present invention, there is provided a combination static and dynamic thermal insulation system comprising a plurality of layers of insulative and light transmissive beads and foam bubbles disposed in the interstices therebetween.

Still further in accordance with an embodiment of the present invention there are provided insulative mattresses or rafts comprising an enclosure formed of a solar energy transmissive material and a dynamic foam insulation system communicating with the interior of the enclosure for maintaining it filled with insulative foam.

A selective coating may also be associated with the bottom of the floating insulation layer for heating the liquid layer in contact therewith.

BRIEF DESCRIPTION OF THE DRAWINGS

The present invention will be more fully understood and appreciated from the following detailed description taken in conjunction with the drawings in which:

FIG. 4 is a sectional illustration of a solar pond covered with insulative mattresses constructed and operative in accordance with an alternative embodiment of the present invention; and FIG. 5 is a detailed sectional illustration of a mattress employed in the embodiment of FIG. 4.

DETAILED DESCRIPTION OF THE INVENTION

Figure 1:
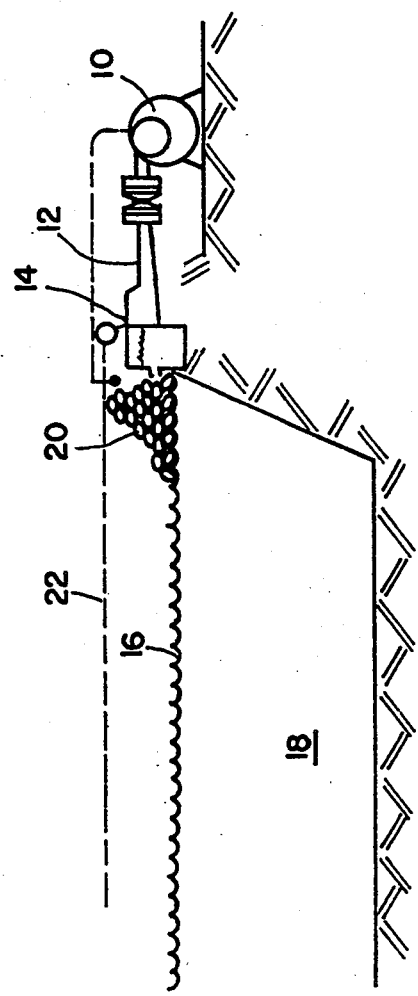
FIG. 1 is a sectional illustration of apparatus for producing an insulating layer constructed and operative in accordance with an embodiment of the present invention.

Reference is now made to FIG. 1 which shows apparatus for producing an insulating layer constructed and operative in accordance with an embodiment of the invention. In the illustrated embodiment, a bubble layer of a material immiscible with water is provided over a body of liquid such as water. It is appreciated that the invention is not limited in its applicability to water and applies to the provision of a bubble layer of a first material over a second material, wherein the bubble layer has the following properties:

1. It is substantially transparent to solar radiation

2. It is generally opaque to back radiation from the covered body of water in the infra red band in the range of 6–20 microns.

3. It is generally resistant to molecular diffusion therethrough of molecules of the second material.

In the embodiment of FIG. 1, the bubbles are provided by an air compressor 10 which communicates via a conduit 12 with a bubble material reservoir 14. Reservoir 14 is located in communication with a volume lying over the surface 16 of a body of liquid 18, such as water, in a solar pond. Alternatively, where it is possible and desirable to maintain a layer of bubble material of sufficient thickness over surface 16, and, of course, where such material floats on the surface 16 of the body of liquid, the reservoir 14 may be eliminated. Air supplied under pressure from compressor 10 provides bubbles of a desired size which together define a bubble layer 20, which of course may comprise many layers of bubbles of uniform or non-uniform size. A securing web element 22, such as a screen or web of fabric is provided to retain the bubbles against being blown away. In certain instances the securing web element 22 may be eliminated, when the bubble material is sufficiently dense or viscous to make the bubble layer tend to say in place notwithstanding external forces such as wind.

It is a particular feature of the present invention that the bubble material is selected such that the bubble layer has the three properties listed hereinabove. One example of a suitable material is surface activated mineral oil or paraffin oil.

The use of the above-identified bubble materials provides a bubble layer with the above-listed three properties which render it extremely useful for absorbing solar radiation in a solar pond or structure with similar requirements, and for retaining the heat of the solar pond against conduction and radiation losses.

Figure 2:
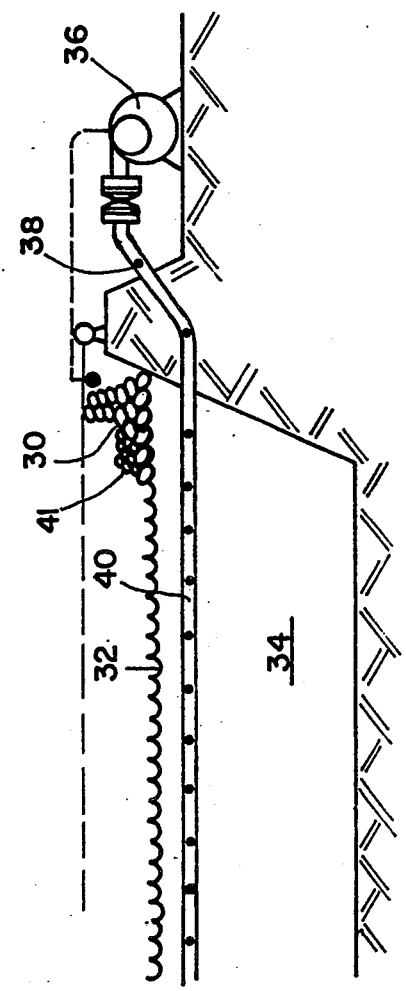
FIG. 2 is a sectional illustration of a solar pond covered with a combination static and dynamic thermal insulation system constructed and operative in accordance with an embodiment of the present invention.

Reference is now made to FIG. 2 which illustrates part of a solar pond surface covered with a combination static and dynamic insulation system constructed and operative in accordance with an embodiment of the present invention. A layer of insulative beads 30, typically comprising a plurality of layers of beads, is disposed on a surface 32 of a solar pond 34. The beads are selected to have the three properties referred to hereinabove and may comprise one or more of the following: hollow glass beads, or hollow beads formed of one of a variety of plastic materials characterized stability in the presence of heat and sunlight, resistance to hot water, transparency to solar radiation (above 80%) and high optical absorptivity (above 60%) within the thermal infra-red region 6–20 μm. Such materials may be selected from a group containing, for example, inter alia glass, epoxy resins, improved polyurethanes, thermoplastic polyesters, fluorocarbons (PVF, FEP, etc) in combination with appropriate additives, or polycarbonate.

The beads may be formed in any desired shape or shapes although typically they are spherical.

According to one embodiment of the invention, an air compressor 36 is provided for communication with a conduit 38 with a plurality of apertured air outlet tubes 40 which are disposed within the solar pond 34 and below surface 32. A suitable surfactant may be provided for producing bubbles 41. The bubbles tend to fill the interstices between the beads 30 and thus to provide enhanced insulation protection. It is noted that the bubbles 41 need not necessarily possess all of the three properties set forth hereinabove. Rather, it is sufficient if the bubbles possess only the first two listed properties.

According to an alternative embodiment of the invention, instead of air outlet tubes 40 and surfactant, there may be provided a bubble material of the type described hereinabove in connection with FIG. 1 and a connection between the air compressor and such material above the surface of the solar pond 34 for producing bubbles.

The embodiment of FIG. 2 has a number of advantages: The static nature of the beads gives stability to the insulative layer, obviating the need for a restraining web in most cases. Secondly, the presence of the beads greatly reduces the quantity of bubbles that is required to provide desired insulation qualities. Thirdly, the presence of the beads reduces the molecular diffusion through a water based bubble layer.

Figure 3:
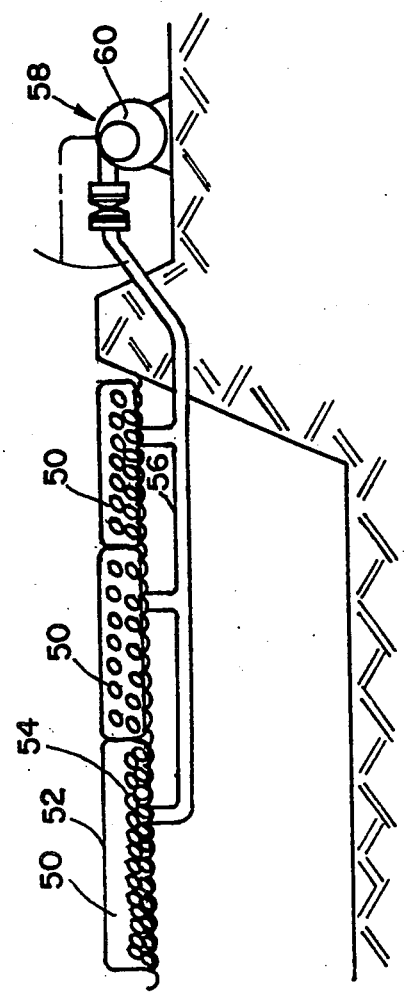
FIG. 3 is a sectional illustration of a solar pond covered with insulative mattresses constructed and operative in accordance with an embodiment of the present invention.

Reference is now made to FIG. 3 which illustrates a solar pond having a plurality of insulative mattresses 50 disposed on the surface thereof. The mattresses comprise an enclosure 52 formed of a web material containing a material such as a fluoroplastic, glass, polyvinyl fluoride (PVF) or fluorinated ethylene propylene.

Disposed within the enclosure 52 is a dynamic foam 54 typically water based or oil based in accordance with the teachings of the present invention. According to one embodiment of the invention, each enclosure 52 communicates via conduits 56 with a foam generating device 58 typically comprising an air compressor 60 and a reservoir containing foamable material.

According to an alternative embodiment of the present invention, the individual enclosures 52 need not be maintained in communication with a foam generating device. This is possible where an extremely stable foam is employed, such that it retains its foamed qualities over an extended period of time. Such a foam may be provided by using glycerol as a foaming material.

Reference is now made to FIG. 4 which illustrates a solar pond covered with insulative mattresses or rafts constructed and operative in accordance with an alternative embodiment of the invention. FIG. 5 provides a detailed illustration of the construction of the mattresses. According to the embodiment of FIGS. 4 and 5 there is provided a body of liquid 60, such as water defining a top surface 62. Arranged in floating relationship on the surface 62 are a plurality of mattresses or rafts 64 which are characterized in that they have the three properties listed hereinabove in connection with the embodiment of FIG. 1.

The outer enclosure material, and inner barrier layers of rafts 64 may be constructed of material similar to that described hereinabove in connection with enclosure 52. The interior material of the rafts in accordance with this embodiment of the invention comprises a plurality of layers of web material, indicated here as layers 70, 72, 74, 76 and 78. It is appreciated that a greater or lesser number of layers may be provided. It will be appreciated that the transmissivity of the raft to solar radiation is enhanced by increasing the number of layers of web material.

According to a preferred embodiment of the present invention, a highly viscous liquid material may be provided on the surface of the solar pond in the interstices between the rafts. This liquid material layer provides damping of the motion of the rafts and also provides a vapor diffusion barrier at the interstices. Preferably the material should be translucent. A suitable material is polymethyl siloxane having a viscosity $10^3$–$10^4$ centistokes, low volatility and density less than unity.

According to a preferred embodiment of the invention, the layers of web material comprise any one of the materials listed hereinabove as possible constituents of insulative beads 30. Further in accordance with a preferred embodiment of the invention, the surfaces of adjacent layers of web material may be coated with a material 80, having a relatively low index of refraction, such as a fluorocarbon, having an index of refraction of about 1.3. This material may conveniently be applied in the form of a paste or "grease". According to a further embodiment of the invention, coating material 80 may in fact comprise a plurality of separate coating layers. A preferred embodiment of such a structure calls for the individual coating layers to have differing indices of refraction which increase along the path of incident solar radiation into a layer of web material and decrease along the path of incident solar radiation out of a layer of web material towards an air gap.

The usefulness of the provision of the material 80 in single or multiple layer form may be appreciated from a consideration of the following expression which represents the total transmissivity of a multilayer body to solar radiation:

$$\text{Total Transmissivity} = \tau \approx \left\{ 1 - \left[ \left( \frac{n_1 - 1}{n_1 + 1} \right)^2 + \left( \frac{n_2 - n_1}{n_2 + n_1} \right)^2 \right] \right\}^{2m} \quad (1)$$

where
$n_1$ = refractive index of the coating material;
$n_2$ = refractive index of the coated web material;
$m$ = number of successive light transmissive layers.

It may be appreciated that for the same number of layers, typically 8 in number, if the material 80 were eliminated, the transmissivity would decrease by approximately 35%.

The use of a multiplicity of coating layers having different indices of refraction as described hereinabove can increase transmissivity by a factor of about 5–10% for eight layers.

It will be appreciated that both the layers of web material and the coating layers may be employed in the form of films of selectable thickness. A selective coating, characterized by high absorptivity (above 85%) in the incident solar radiation spectrum and low emissivity (under 30%) in the thermal infra-red re-radiation spectrum may be provided in association with the bottom surface of the insulating raft.

It will be appreciated by persons skilled in the art that the invention is not limited by what has been particularly shown and described hereinabove. Rather the scope of the present invention is defined only by the claims which follow:

We claim:

1. Thermal insulation suitable for use along a solar radiation incident surface of a solar pond containing a pond liquid and comprising:
   a plurality of transparent enclosures arranged to be disposed on a surface of a solar pond;
   at least one layer of insulative beads disposed within said enclosures;
   said at least one layer of insulative beads defining a plurality of barrier layers, separated from each other by insulating volumes defined by said insulating beads;
   a liquid material of viscosity greater than the viscosity of the pond liquid arranged to fill the interstices between said plurality of enclosures;
   said at least one layer of insulative beads defining said barrier layers being formed of a material selected from the following materials:
   glass, fluoroplastics, acrylics and polycarbonate and being characterized by transmissivity to solar radiation and opacity to thermal infra-red radiation in the wavelength range of 6–20 microns;
   said volumes defined by said insulative beads being characterized by low thermal conductivity and high transparency to solar radiation.

2. Thermal insulation according to claim 1 and wherein said volume is defined by a gas.

3. Solar pond apparatus comprising:
   a body of pond liquid desired to be heated and defining a top surface; and thermal insulation arranged along said top surface, said thermal insulation comprising
   a plurality of transparent enclosures arranged to be disposed on a surface of a solar pond;
   at least one layer of insulative beads disposed within said enclosures;
   said at least one layer of insulative beads defining a plurality of barrier layers, separated from each other by insulating volumes defined by said insulative beads;
   a liquid material of viscosity greater than the viscosity of the pond liquid arranged to fill the interstices between said plurality of enclosures;
   said at least one layer of insulative beads defining said barrier layers being formed of a material selected from the following materials:
   glass, fluoroplastics, acrylics and polycarbonate and being characterized by transmissivity to solar radiation and opacity to thermal infra-red radiation in the wavelength range of 6–20 microns;
   said volumes defined by said insulative beads being characterized by low thermal conductivity and high transparency to solar radiation.

4. Apparatus according to claim 3 and also comprising web-type retaining means for retaining said thermal insulation in a desired position over a body of liquid.

5. Apparatus according to claim 3 and wherein said body of liquid comprises generally clean, generally non-saline water.

6. Apparatus according to claim 3 and also comprising a selective coating associated with bottom of said thermal insulation in thermal contact with said body of liquid.

7. Thermal insulation according to claim 1 and also comprising a selective coating associated with a bottom surface of said thermal insulation in thermal contact with said body of liquid.

8. Thermal insulation according to claim 1 and wherein said at least one layer of insulative beads comprises a single layer of insulative beads.

9. Thermal insulation according to claim 3 and wherein said at least one layer of insulative beads comprises a single layer of insulative beads.

* * * * *

UNITED STATES PATENT AND TRADEMARK OFFICE
CERTIFICATE OF CORRECTION

PATENT NO. : 4,480,632

DATED : November 6, 1984

INVENTOR(S) : Shimon KLIER et al

It is certified that error appears in the above—identified patent and that said Letters Patent is hereby corrected as shown below:

Column 3, line 24, read "say" as --stay--

Signed and Sealed this

Eighth Day of October 1985

[SEAL]

Attest:

DONALD J. QUIGG

Attesting Officer

Commissioner of Patents and Trademarks—Designate